United States Patent [19]

Peppiatt

[11] Patent Number: 5,033,868
[45] Date of Patent: Jul. 23, 1991

[54] FLEXIBLE PLASTIC BAG WITH PERFORATED HANDLE

[75] Inventor: Harry R. Peppiatt, Doylestown, Pa.

[73] Assignee: Paramount Packaging Corporation, Chalfont, Pa.

[21] Appl. No.: 423,517

[22] Filed: Oct. 13, 1989

Related U.S. Application Data

[63] Continuation of Ser. No. 283,053, Dec. 7, 1988, abandoned, which is a continuation of Ser. No. 863,491, May 15, 1986, abandoned, which is a continuation-in-part of Ser. No. 821,561, Jan. 21, 1986, Pat. No. 4,713,839, which is a continuation-in-part of Ser. No. 388,381, Jun. 14, 1982, Pat. No. 4,573,203.

[51] Int. Cl.⁵ .................. B65D 33/08; B31B 1/86
[52] U.S. Cl. .................. 383/29; 53/413; 206/620; 206/626; 383/8; 383/10; 383/24; 383/63; 493/226
[58] Field of Search .......... 383/6, 8, 10, 15, 21, 383/24, 28, 29, 30, 41, 61, 63–65, 67, 120, 123, 124; 206/620, 621, 610, 626, 632; 53/413; 493/214, 226

[56] References Cited

U.S. PATENT DOCUMENTS

| | | | |
|---|---|---|---|
| 2,693,836 | 11/1954 | Hayes | 383/29 |
| 2,722,368 | 11/1955 | Gottsegen | 206/620 X |
| 3,093,295 | 6/1963 | Kugler | 206/620 |
| 3,181,583 | 5/1965 | Lingenfelter | 206/632 X |
| 3,253,593 | 5/1966 | Cronin, Jr. | 383/29 X |
| 3,282,493 | 11/1966 | Kamins et al. | 206/620 |
| 3,370,630 | 2/1968 | Haugh et al. | 383/21 |
| 3,456,867 | 7/1969 | Repko | 206/632 X |
| 3,462,068 | 8/1969 | Suominen | 383/15 X |
| 3,471,871 | 10/1969 | Nociti et al. | 206/620 X |
| 3,509,927 | 5/1970 | Hasty et al. | 383/63 X |
| 3,640,381 | 2/1972 | Kanada et al. | 206/632 X |
| 3,738,567 | 6/1973 | Ruda | 206/620 X |
| 3,780,781 | 12/1973 | Uramoto | 206/632 X |
| 3,827,472 | 8/1974 | Uramoto | 383/61 X |
| 4,252,269 | 2/1981 | Peppiatt | 383/10 X |
| 4,518,087 | 5/1985 | Goglio | 206/632 |
| 4,573,203 | 2/1986 | Peppiatt | 383/8 |
| 4,854,733 | 8/1989 | Schwinn | 383/29 |

FOREIGN PATENT DOCUMENTS

| | | | |
|---|---|---|---|
| 907574 | 8/1972 | Canada | 220/9 |
| 1103624 | 6/1981 | Canada | 220/6 |
| 2811143 | 9/1979 | Fed. Rep. of Germany | 383/121 |
| 2811219 | 9/1979 | Fed. Rep. of Germany | 383/29 |

*Primary Examiner*—Bryon P. Gehman
*Attorney, Agent, or Firm*—Fitzpatrick, Cella, Harper & Scinto

[57] ABSTRACT

A reusable flexible plastic bag is provided with a handle which serves to carry the bag and to reseal it. The bag is manufactured from two webs: a web from which the bag panels are formed and a web from which a loop handle is formed. The top end of the bag is not provided with a gusset. The loop handle is secured to the bag panels and is provided with a frangible region which can be broken to form two separate handle portions. The handle portions are releasably joined by mating slide closure structure. The slide closure joint can be peeled away by pulling the handle portions apart thereby providing access to the folded top end of the bag. The top end of the bag may be provided with perforations which may be broken to gain access to the bag contents. The bag may be resealed by means of the handle slide closure.

20 Claims, 2 Drawing Sheets

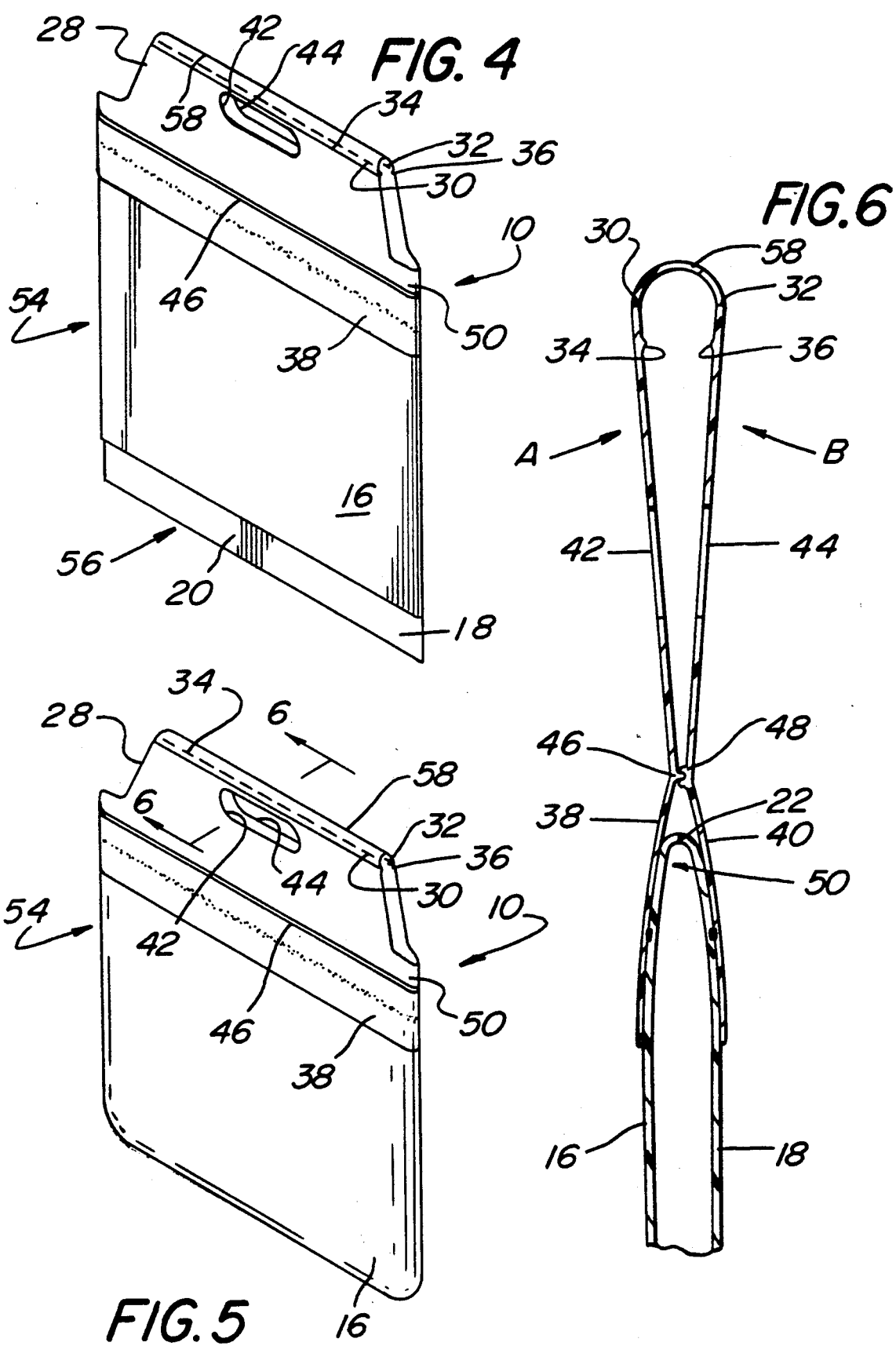

FLEXIBLE PLASTIC BAG WITH PERFORATED HANDLE

This application is a continuation of Ser. No. 283,053, filed Dec. 7, 1988, now abandoned, which is a continuation of Ser. No. 863,491, filed May 15, 1986, now abandoned, which is a continuation-in-part of Ser. No. 821,561, filed Jan. 21, 1986, now U.S. Pat. No. 4,713,839, which is a continuation-in-part of Ser. No. 388,381, filed June 14, 1982, now U.S. Pat. No. 4,573,203.

BACKGROUND OF THE INVENTION

The invention is directed to the flexible packaging art. Flexible plastic bags of the general type involved herein are known. For example, see U.S. Pat. No. 4,252,269. When goods are packaged and sealed in the bag as disclosed in said patent, the bag is destroyed when one gains access to the contents of the bag. Such destruction of the bag is considered to be an unnecessary waste. In U.S. Pat. No. 4,573,203, there is disclosed a flexible plastic bag which enables goods to be sealed therein while allowing the seal to be broken whereby the goods can be accessed and the bag reused. In said patent, the bag is manufactured from two separate webs of flexible plastic material, one web being used to form the front and rear panels and gusset of the bag, and the other web being used to form a loop handle connected to the front and rear panels adjacent the gusset region. In copending application Ser. No. 821,561 on: Resealable Reusable Flexible Plastic Bag With Loop Handle, filed Jan. 21, 1986 in the name of the inventor herein and assigned to the assignee herein, there is disclosed a separate handle and slide closure, the slide closure comprising mating portions secured to the bag gusset to provide access to the goods in the bag. In copending application Ser. No. 855,561 on: Flexible Pilfer Proof Reusable Bag With Tearable Handle and Method of Making Same, filed Apr. 25, 1986 in the name of the inventor herein and assigned to the assignee herein, there is disclosed a gusseted bag having a handle provided with a slide closure secured to the gusset.

The present invention is directed to the solution of the problem of constructing a flexible plastic bag by a high speed mass production technique wherein the handle structure of the bag may be utilized to both carry and reseal the bag.

SUMMARY OF THE INVENTION

The present invention is directed to a flexible plastic bag which is reusable and has generally rectangular front and rear panels and a closed end of the bag formed by a single fold of material without a gusset. The closed end of the bag may be provided with a frangible region, preferably defined by perforations therealong. A loop handle secured to each panel is also provided with a frangible region, preferably defined by perforations, so as to be separable into two handle portions. The two handle portions are releasably joined together by a slide closure above the closed end of the bag.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 is a partial plan view of a continuous web of flexible plastic material.

FIG. 2 is a partial plan view of the web in FIG. 1 folded over to form a single fold region.

FIG. 3 is a partial plan view of the web with a handle web attached thereto.

FIG. 4 is a perspective view of the bag of the present invention prior to filling.

FIG. 5 is a perspective view of a filled package made from the bag of the present invention.

FIG. 6 is a section taken along 6—6 in FIG. 5.

DETAILED DESCRIPTION OF THE INVENTION

Figure 1:
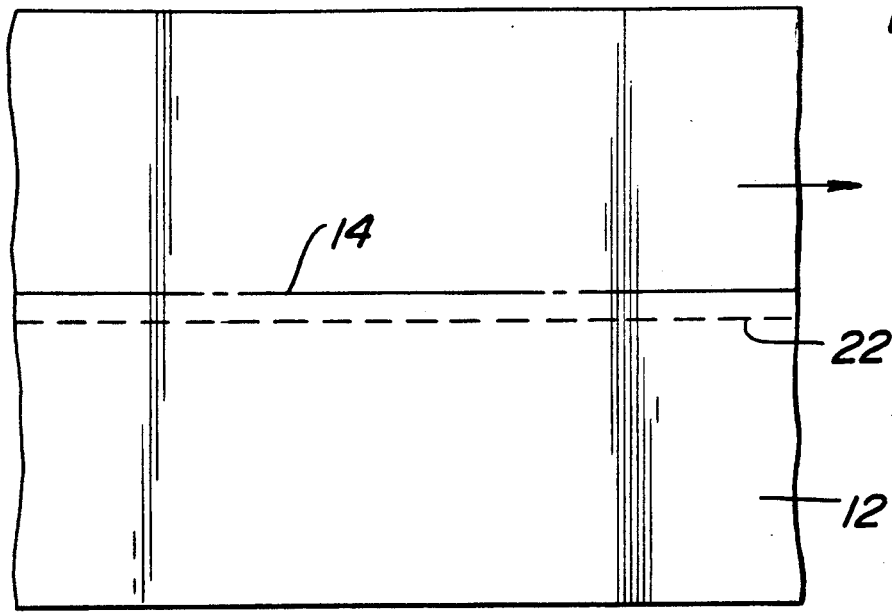
FIGS. 1-3 show the manner in which the bag of the present invention may be mass produced from two separate moving webs.

Referring to the drawings, wherein like numerals indicate like elements, there is shown in FIG. 5 a package 10 made from the bag of the present invention wherein the bag is produced by a high speed mass production technique from two separate webs of flexible plastic material. The package is sealed so as to prevent access to the goods except in a manner which will be readily apparent and described in greater detail hereafter. The package 10 is filled with a product such as feminine napkins. The bag assumes a flattened tube-shape due to the bag structure described hereafter.

Figure 2:
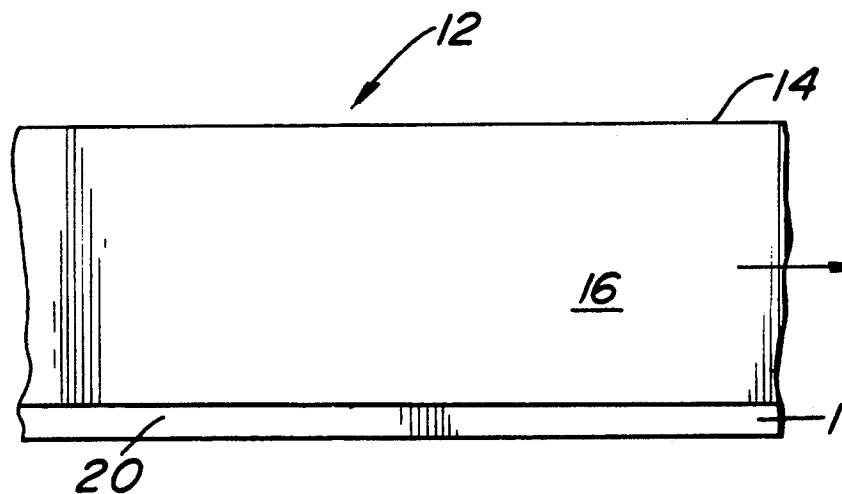
Figure 3:
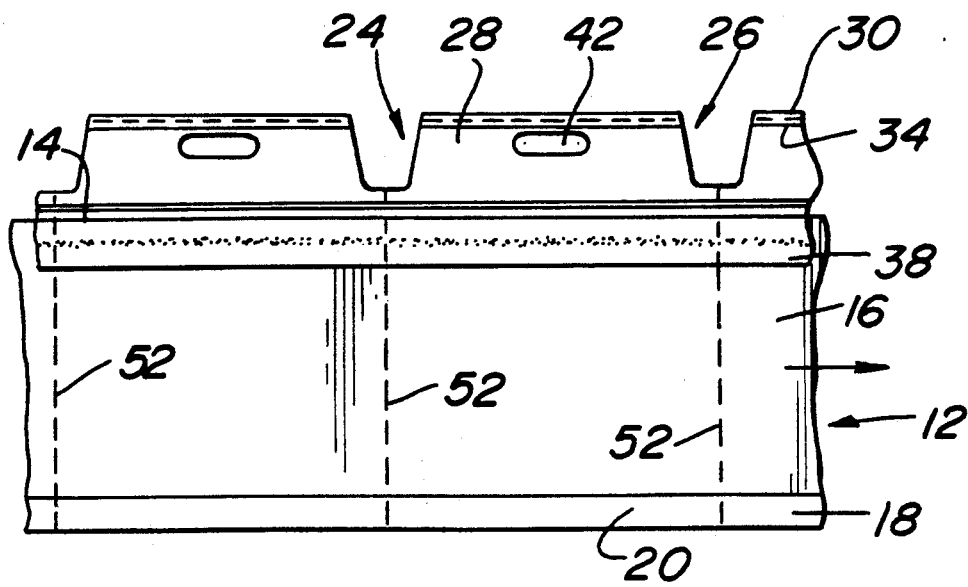

Referring to FIGS. 1-3, the bag is constructed from a continuous moving web 12 of flexible thermoplastic material. Preferably, the web 12 is a single, unitary piece of material which is opaque and has printing on its outer surface. The web may be a laminate wherein an outer transparent layer is adhesively or otherwise bonded to an inner opaque layer having printing on its outer surface. The outer layer protects the printing. The web may be made of polypropylene, polyester, polyethylene, etc. If desired, perforations 22 may be formed in web 12 to facilitate opening the bag as described hereafter.

As shown in FIG. 2, the web is folded over at fold line 14 to form overlying front and rear panels 16, 18. It should be noted that web 12 is folded so as to form a single fold region only at the closed end of the bag. Thus, no gusset is formed in the bag. Front panel 16 is shorter in height than rear panel 18 whereby the rear panel has a tab 20 projecting beyond the front panel 16.

A continuous moving handle web 24 having spaced handle portions 26 therealong is applied to the web 12 as shown in FIG. 3. The handle web 24 is made of a flexible thermoplastic material. The web may be made of polypropylene, polyester, polyethylene, etc. It is preferred that the handle web be transparent. Each handle portion 26 includes a loop handle 28 provided with spaced parallel lines of perforations 30, 32 adjacent ribbed portions 34, 36. See FIGS. 5 and 6. Each handle portion 28 also includes flange portions 38, 40 which are line welded to panels 16, 18 respectively to secure the handle portion to the panels.

Aligned oval-shaped openings 42, 44 are die cut in loop handle 28. The openings 42, 44 permit the handle to be grasped by the user. The loop handle is provided with mating slide closure structure preferably in the form of a rib 46 and a groove 48 for frictionally receiving the rib. The user may releasably join the rib and groove simply by pressing a region of the rib and groove together between the thumb and forefinger and by sliding the fingers along the entire length of the rib and groove. The slide closure joint seals off and protects the closed end of the bag defined by the single fold region 50 which extends between the line welds along handle flange portions 38, 40. See FIG. 6.

Web 12 is cut along lines 52 which define the side edges of panels 16, 18 and the side edges of the handle flange portions 38, 40. The side edges of the panels and handle flange portions are heat welded together to form bag 54 as shown in FIG. 4. The single fold region 50 defines the closed top end of the bag 54. The bottom ends of the front and rear panels 16, 18 are open so that the bag may be "bottom loaded" with product through opening 56. See FIG. 4.

The bag 54 as shown in FIG. 4 may be loaded as a stack of bags on a bagging machine with prongs or wickets extending through aligned holes (not shown) formed in the tab 20. When product is machine-fed into the bottom of the bag, it is done with sufficient force so as to strip the bag off the prongs by tearing the tab 20 proximal the holes. The bag is structurally formed so as to be capable of being machine-loaded with goods which causes the single fold region 50 to flatten at the closed end of the bag between handle flange portions 38, 40. The bag is formed so as to assume a generally flattened tubular shape when filled. The open bottom end of the bag is then sealed by heat welding or the like to form the sealed package 10 shown in FIG. 5.

The slide closure or press-lock joint running across the loop handle 28 completely seals the single fold region 50 at the closed top end of the bag. To break the seal and access the goods within the bag, tear-away handle portion 58 lying between the lines of perforation 30, 32 is stripped away from the handle. The reinforcing ribs 34, 36 proximal the handle bight contain the tear-away portion to the region of the loop handle bight. As a result, the loop handle is cleanly separated into two portions A, B which may then be pulled apart to break the slide closure joint by peeling rib 46 away from groove 48. Such access does not destroy the utility of the bag, since the handle portions A, B remain intact, whereby the bag may be reused as a shopping bag once the contents are depleted.

Once the slide closure defined by rib 46 and groove 48 is broken, the single fold region 50 may be severed by scissors or other sharp instrument to enter the bag. Alternatively, if perforations 22 are provided in the web 12 (FIG. 1), the single fold region 50 may be broken by pressing along the perforations.

The present invention may be embodied in other specific forms without departing from the spirit or essential attributes thereof and, accordingly, reference should be made to the appended claims, rather than to the foregoing specification, as indicating the scope of the invention.

I claim:
1. Flexible plastic bag, comprising:
a unitary piece of flexible plastic material having generally rectangular front and rear panels and a single fold region integral with said panels at one of the bag; and
a flexible plastic loop handle secured to said panels on opposite sides of said fold region, said loop handle being frangible along a portion thereof such that the loop handle is separable at the frangible portion into two handle portions which remain secured to the panels, each handle portion including a substantially oval opening, said frangible portion being disposed above a grippable portion of each substantially oval opening, said frangible portion comprising at least one line of perforations disposed substantially parallel to a longitudinal axis of the oval openings.

2. A bag according to claim 1 wherein said single fold region is provided with perforations so as to facilitate breaking said region to access the interior of the bag.

3. A bag according to claim 1 wherein said frangible portion includes a tear-away portion for separating the handle into said two handle portions.

4. A bag according to claim 1 wherein at least a portion of a portion of said loop handle and said single fold region are connected together such that said bag assumes a generally flattened, tubular shape when filled, with said single fold region forming a closed end of the bag.

5. A bag according to claim 1 further comprising means for releasably joining said two handle portions including a rib on one handle portion and a groove on the other handle portion for receiving the rib, said rib and groove defining a slide closure.

6. A bag according to claim 1 wherein said loop handle is secured to said panels outside said fold region.

7. A bag according to claim 1 wherein said front and rear panels are open at the other end of the bag to facilitate introducing goods into the bag.

8. A flexible plastic bag according to claim 1, further comprising two reinforcing ribs disposed above the oval openings and substantially parallel to the frangible portion.

9. A bag according to claim 1, wherein said loop handle further includes means for releasably joining the two handle portions together so as to prevent access to said single fold region.

10. A flexible plastic bag according to claim 9, wherein the frangible portion comprises two parallel lines of perforations disposed substantially parallel with a longitudinal axis of the means for releasably joining the two handle portions together.

11. Method of making a flexible plastic bag, comprising the steps of:
providing a unitary web of flexible plastic material;
folding said web along a fold line to form generally rectangular overlying front and rear panels and a single fold region integral with said panels;
providing a loop handle having a frangible portion whereby the loop handle is separable along the frangible portion into two handle portions, each handle portion having a substantially oval opening, the frangible portion being disposed between the oval openings of the two handle portions, said frangible portion comprising at least one line of perforations disposed substantially parallel to a longitudinal axis of said oval openings; and
securing the loop handle to said panels on opposite sides of said fold region such that said two handle portions remain secured to the panels when said loop handle is separated at said frangible portion.

12. Method according to claim 11 including providing said web with a frangible region by perforating said web.

13. The method according to claim 11 wherein the loop handle is secured to said panels outside said fold region.

14. Method according to claim 11 including joining at least a portion of said loop handle and a portion of side edges of the single fold region such that said bag assumes a generally flattened tubular shape when filled.

15. A method according to claim 14 wherein said step of joining said loop handle and said single fold region includes heat welding.

16. A method of making a flexible plastic bag according to claim 11, wherein said step of providing a loop handle comprises the step of forming two lines of perforations as the flangible portion.

17. A method of making a flexible plastic bag according to claim 11, further comprising the step of forming at least one reinforcing rib in the loop handle below the frangible portion and above the oval openings.

18. A method according to claim 11, wherein the providing step includes the further step of providing the loop handle with structure for releasably joining the two handle portions.

19. A flexible plastic bag comprising:

- an integral sheet of flexible plastic material forming a front and a rear panel of said bag, said integral sheet of plastic material having a fold at one end thereof;
- a second sheet of flexible plastic material forming a loop handle and having two edges coupled to outside surfaces of said integral sheet of plastic material adjacent said fold;
- two substantially oval openings formed in said loop handle, each having a longitudinal axis; and
- perforations formed in said loop handle above the grip sections and substantially parallel with the longitudinal axes of the oval openings.

20. A bag according to claim 19, further including resealable closure means formed in the loop handle below the oval openings and above the two edges of the loop handle and substantially parallel with the longitudinal axes of the oval openings.

* * * * *

UNITED STATES PATENT AND TRADEMARK OFFICE
CERTIFICATE OF CORRECTION

PATENT NO. : 5,033,868

DATED : July 23, 1991

INVENTOR(S) : HARRY R. PEPPIATT

It is certified that error appears in the above-identified patent and that said Letters Patent is hereby corrected as shown below:

COLUMN 3:

Line 61, "one of" should read --one end of--.

COLUMN 4:

Line 14, "a portion of said loop handle and said" should read --said loop handle and a portion of said--.

COLUMN 5:

Line 9, "flangible" should read --frangible--.

Signed and Sealed this

Twentieth Day of April, 1993

*Attest:*

MICHAEL K. KIRK

*Attesting Officer*      *Acting Commissioner of Patents and Trademarks*